United States Patent [19]

McNutt et al.

[11] Patent Number: 4,730,690

[45] Date of Patent: Mar. 15, 1988

[54] OBJECT SENSING ARRANGEMENT

[75] Inventors: Robert L. McNutt; John E. Wible, both of Painesville, Ohio

[73] Assignee: Caterpillar Industrial Inc., Mentor, Ohio

[21] Appl. No.: 902,726

[22] Filed: Sep. 2, 1986

[51] Int. Cl.⁴ .............................................. B60K 28/10
[52] U.S. Cl. ......................................... 180/274; 293/4
[58] Field of Search ............... 180/274, 275, 277, 278, 180/279; 340/61; 293/4, 5

[56] References Cited

U.S. PATENT DOCUMENTS

| 2,522,637 | 9/1950 | Pripeton | 177/311 |
| 3,664,701 | 5/1972 | Kondur | 293/4 |
| 4,363,376 | 12/1982 | Sjoberg et al. | 180/275 |

FOREIGN PATENT DOCUMENTS

| 3330668 | 3/1985 | Fed. Rep. of Germany | 293/4 |
| 185661 | 9/1985 | Japan | 180/275 |
| 2069208 | 8/1981 | United Kingdom | 180/274 |

Primary Examiner—Ross Weaver
Attorney, Agent, or Firm—Alan J. Hickman

[57] ABSTRACT

An arrangement for sensing an object relative to the side of a vehicle requires physical contact between the arrangement and the object. Therefore, mechanically operated object sensing arrangements are prone to damage, frequent malfunctions, and premature failure. An object sensing arrangement for identifying an object within a preselected minimum distance spaced from a first side of a vehicle has first reflective target movably connected to the first side at a location on the first side adjacent a first end portion, and a first connecting apparatus movably connects a first signaling apparatus to the first side at a first location on the first side adjacent a frame second end portion. The first signaling apparatus delivers a first signal to the first reflective target and receives a reflection of the first delivered signal from the first reflective target. The first connecting apparatus is movable in a direction toward the first side and in a passing relationship with the first side in response to an external force being applied to the first connecting apparatus. Therefore, the aforementioned problems related to damage caused by physical contact and the like are alleviated. The object sensing arrangement is particularly suited for use on a material handling vehicle.

18 Claims, 4 Drawing Figures

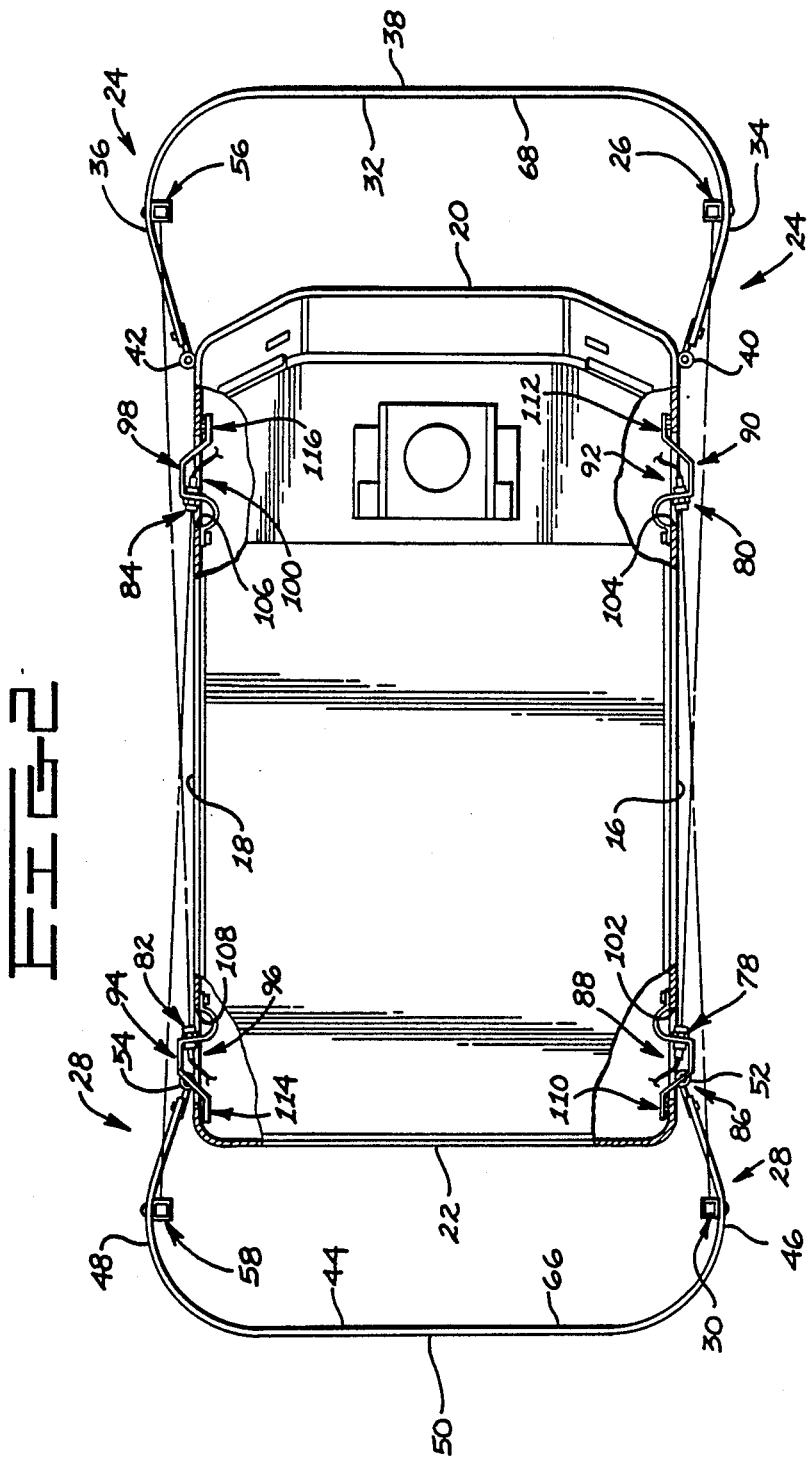

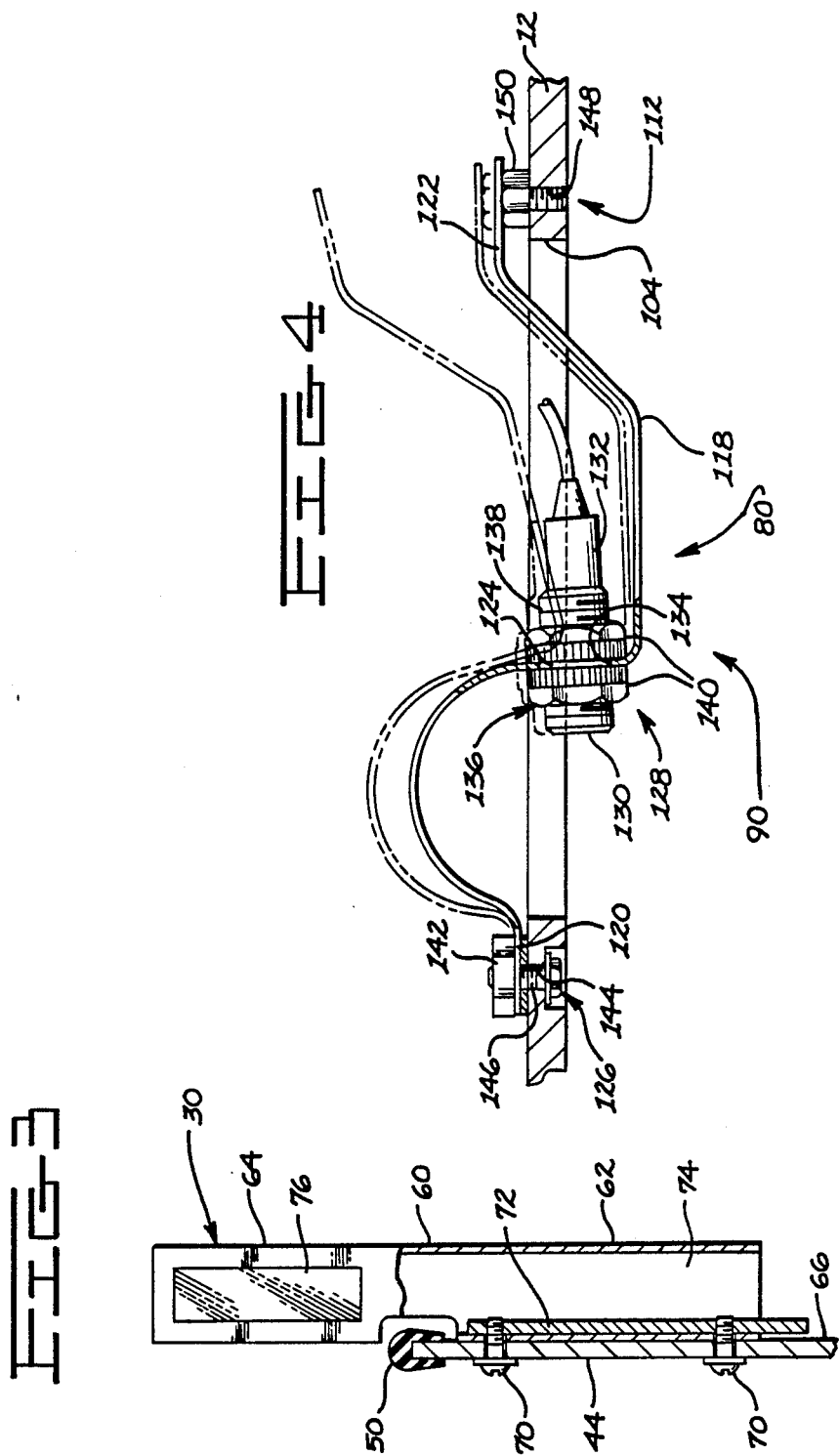

OBJECT SENSING ARRANGEMENT

DESCRIPTION

1. Technical Field

This invention relates to an object sensing arrangement for a vehicle and, more particularly, to an object sensing arrangement having a bumper mounted reflective target, a connecting device for movably connecting a signaling device to the vehicle frame and permitting movement of the signaling device relative to the frame in response to an external force.

2. Background Art

Sensing devices for determining the presence of an object within a preselected minimum distance of a work vehicle, for example, a material handling vehicle, and an automatic guided vehicle, and the like are known. One example of an automatic guided vehicle having an object sensing arrangement mounted thereon is shown in U.S. Pat. No. 3,664,701 to L. Kondor dated May 23, 1972. This patent teaches the use of a reflective target mounted on a flexible bumper and a signal delivering and receiving device mounted at an exposed location on the vehicle. Because the bumper must move in order to direct the reflected signal away from the receiving portion of the sensing arrangement, physical contact must be made between the bumper and object. As a result of this contact, misalignment between the target and the sensing apparatus may occur. Also, because the signal delivering and receiving device is rigidly connected to the vehicle at an exposed location on the vehicle, the potential for damage thereto is a major concern.

Sensing of an object within a preselected minimum distance of the sides of the vehicle has been heretofore achieved through physical contact between an object and an object sensing device. One example of an object sensing device of this type is shown in U.S. Pat. No. 2,522,637 to G. Pripeton dated Sept. 19, 1950. This patent teaches a light signal delivering device pivotally mounted at one end of the vehicle and a light receiving device pivotally mounted at the other end of the vehicle. The light signal delivering device normally directs the light signal to the light signal receiving device. This arrangement relies on physical contact between the object and either one of the light signal delivering and receiving devices to cause movement thereof which will result in the light signal not being received by the light signal receiving device. Since the light signal delivering and receiving devices must contact the object in order to indicate when the object is too close to the sides of the vehicle, a potential for damage to the devices, and for that matter the object itself, are prevalent.

Object sensing arrangements which deliver a signal to an external object and receive a reflected signal from the external object are known in the art. This type of system, however, has a tendency to be unpredictable since it relies upon a reflection of the delivered signal from an object which is often of poor reflecting quality. Therefore, the reflected signal is not adequate in intensity to be sensed by the signal receiving portion of the sensing arrangement and the potential for contact between the vehicle and the object may occur. Therefore, a positive signal reflection of adequate intensity must be provided for satisfactory signal operation.

The present invention is directed to overcoming one or more of the problems as set forth above and provide an object sensing arrangement which positively identifies an object within a preselected range of distance from the vehicle sides, which prevents damage to the signal delivering and receiving device should contact between the signal delivering/receiving device and an external object occur, and one which is simple in construction and economical to produce.

DISCLOSURE OF THE INVENTION

An object sensing arrangement for a vehicle having a frame which has first and second spaced apart sides and first and second spaced apart end portions connected to and between the first and second spaced apart sides is provided. A first connecting apparatus movably connects a first signaling apparatus to the frame first side at a first location on the frame first side adjacent the frame second end portion. The first signaling apparatus is adapted to deliver a first signal to the first reflective target and receive a reflection of the first delivered signal from the first reflective target. The first signaling apparatus is movable in a direction toward the frame first side, in a passing relationship with the frame first side, to a location between the frame first and second sides in response to an external force being applied to the first movable connecting apparatus in a direction toward the frame first side.

In another aspect of the present invention, a material handling vehicle having a frame which has first and second spaced apart sides and first and second spaced apart end portions connected to and between the first and second spaced apart sides is provided. A first bumper having first and second spaced apart end portions and an upper edge is connected at the first end portion to the frame first side at a location on the frame first side adjacent the frame first end portion, and the first bumper second end portion is connected to the frame second side at a location on the frame second side adjacent the frame first end portion. A second bumper having first and second spaced apart end portions and an upper edge is connected at the second bumper first end portion to the frame first side at a location the frame first side adjacent the frame second end portion and at the second bumper second end portion to the frame second side at a location on the frame second side adjacent the frame second end portion. A first reflective target is connected to the first bumper first end portion and extends elevationally from the first bumper first end portion to a location spaced above the first bumper upper edge. A second reflective target is connected to the second bumper first end portion and extends elevationally from the second bumper first end portion to a location spaced above the second bumper upper edge. A first signaling means for delivering a first signal to the first reflective target and receiving a reflection of the first delivered signal from the first reflective target is provided. A second signaling means for delivering the second signal to the reflective target and receiving a reflection of the second delivered signal from the second reflective target is provided. A first connecting means movably connects the first signaling means to the frame first side at a first location on the frame first side adjacent the frame second end portion and a second connecting means movably connects the second signaling means to the frame first side at a second location on the frame first side spaced from the first location and adjacent the frame first end portion. The first signaling means is movable in a direction toward the frame first side, in a passing relationship with the frame first side, to a location between the first and second frame sides in response to an external force being applied to the first connecting means in a direction toward the frame first side. The second signaling means is movable in a direction toward the frame first side, in a passing relationship with the frame first side, to a location between the frame first and second sides in response to an external force being applied to the second connecting means in a direction toward the frame first side.

The object sensing arrangement of the present invention requires a positive signal reflection from the target to the signaling means to determine the absence of an object within a preselected distance of the side of the vehicle, prevents damage to the signaling means through movable connection of the signaling means to the vehicle side, reduces the potential of damage to the object contacted by the signaling means by the movable connecting means, and eliminates any blind spots on the vehicle side through the placement of the target on the bumper end portion.

BRIEF DESCRIPTION OF THE DRAWINGS

FIG. 2 is a diagrammatic top elevational view of FIG. 1 showing the material handling vehicle of FIG. 1 in greater detail and the relative locations of the first, second, third, and fourth targets; first, second, third, and fourth connecting means; and first, second, third, and fourth signaling means;

FIG. 3 is an enlarged diagrammatic cross-sectional view taken along lines III—III of FIG. 1 showing the second target in greater detail; and FIG. 4 is an enlarged diagrammatic view of the second signaling and connecting means shown in FIG. 2.

BEST MODE FOR CARRYING OUT THE INVENTION

Figure 1:
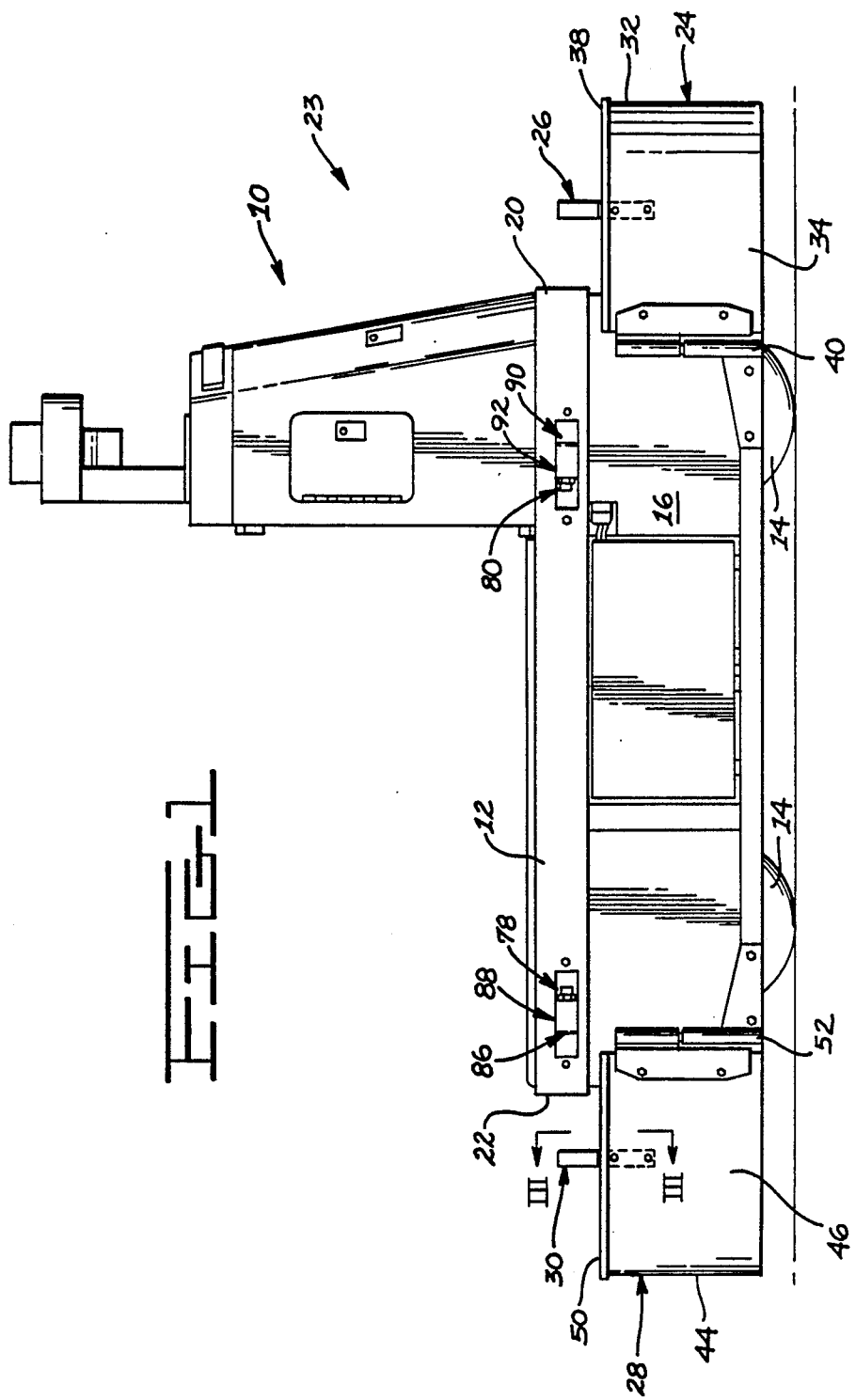
FIG. 1 is a side elevational view of a material handling vehicle of the automatic guided vehicle type showing first and second bumpers mounted on the vehicle frame adjacent the first and second vehicle end portions, respectively, first and second targets mounted on the first and second bumpers, respectively, and first and second connecting means for movably connecting first and second signaling means to the frame first side.

With reference to the drawings, and particularly FIGS. 1 and 2, a material handling vehicle 10, for example, an automatic guided vehicle of the driverless type, has a frame 12 and a plurality of ground engaging wheels 14 rotatably connected to the frame and suitable for transporting the vehicle along a supporting surface. The frame 14 has first and second spaced apart sides 16,18 and first and second spaced apart end portions 20,22 connected to and between the first and second spaced apart sides 16,18.

A first mounting means 24 movably connects a first reflective target 26 of an object sensing arrangement 23, to the frame first side 16 at a location on the frame first side adjacent the frame first end portion 20, and a second mounting means 28 movably connects a second reflective target 30 of an object sensing arrangement 23, to the frame first side at a location on the frame first side adjacent the frame second end portion 22. The first mounting means preferably includes a first bumper 32 having first and second spaced apart end portions 34,36 and an upper edge extending between the first and second end portions 34,36. The first bumper first end portion 34 is pivotally connected to the frame first side 16 at a location adjacent the frame first end portion 20 by a first hinge assembly 40 and the first bumper second end portion 36 is pivotally connected to the frame second side 18 by a second hinge assembly 42 at a location adjacent the frame first end portion 20. The second mounting means 28, like the first mounting means 24, includes a second bumper 44, has first and second spaced apart end portions 46,48, and an upper edge 50 extending between the second bumper first and second end portions 46,48.

A first hinge assembly 52 pivotally connects the first end portion 46 of the second bumper 44 to the frame first side 16 at a location adjacent the frame second end portion 22 and a second hinge assembly 54 pivotally connects the second end portion 48 of the second bumper 44 to the frame second side 18 at a location adjacent the frame second end portion 22. The first and second hinge assemblies 40,42,50,52,54 each have a vertical axis about which the first and second bumpers 32,44 pivot. The first and second bumpers 32,44 are elongated strips of flexible material, for example, spring steel, nonmetallic plastic material, or any other suitable material. The first and second bumpers 32,44 each deflect in response to a load applied thereto in longitudinal and transverse directions relative to the vehicle 10. The first and second hinge assemblies 40,42,52,54 are secured to the first and second bumpers 32,44 via a plurality of fasteners of any suitable type. The first hinge assemblies 40,52 permit the bumper first end portions 34,46 to move transversely relative to the vehicle frame 12 and the second hinge assemblies 42,54 permits the bumper second end portions 36,48 to move transversely relative to the frame second side 18. As best seen in FIG. 2, the first and second end portions 34,46,36,48 of the bumpers 32,44 each extend outwardly a preselected distance from the frame first and second sides 16,18, respectively, and determines the upper limit of the preselected distance of object sensing.

The first mounting means 24 movably connects a third reflective target 56 of the object sensing arrangement 23 to the frame second side 18 at a location on the frame second side 18 adjacent the frame first end portion 20, and the the second mounting means 28 movably connects a fourth reflective target 58, of the object sensing arrangement 23, to the frame second side 18 at a location on the frame second side 18 adjacent the frame second end portion 22. The first and second targets 26,30 are mounted on the first end portions 34,46 of the first and second bumpers 32,44, respectively, and the third and fourth targets 56,58 are mounted on the second end portions 36,48 of the first and second bumpers 32,44, respectively.

Since the first, second, third, and fourth reflective targets 26,30,56,58 are identical in construction, only reflective target 30 will be described in detail. However, all discussion related to the second target 30 will also pertain to the other reflective targets 26,56,58, unless otherwise specified. Referring to FIG. 3, reflective target 30 includes a post 60 which has first and second spaced apart end portions 62,64. The post 64 is preferably constructed of a tubular stock which is secured to an inside surface 66 of the second bumper 44. It should be observed that the first reflective target 26 is connected to a inside surface 68 of the first bumper 32, and the third and fourth targets 56,58 are connected to the inside surfaces 58 and 66, respectively, of the first and second bumpers 32,44. A plurality of fasteners 70 connect each post first end portion 62 to the appropriate bumper inside surface 66,68. The fasteners 70 are screwthreadably secured to a backing plate 72 disposed in a tubular opening 74 in the post 60. Thus, the post second end portion 62 is sandwiched between the backing plate and the associated inside surface 66,68 which retains the post 60 in a substantially vertical position on the associated bumper 32,44. Each post second end portion 64 is spaced elevationally above the associated second bumper 32,44. A retro-reflective material 76 is connected to the second end portion 64 of the post 60 at a location on the second end portion 64 elevationally above the upper adjacent edge 38,50.

First, second, third, and fourth signaling means 78,80,82,84 of the object sensing arrangement 23 are provided for delivering first, second, third, and fourth signals, respectively, to the first, second, third, and fourth targets 26,30,56,58, respectively, and receiving a reflection of the first, second, third, and fourth delivered signals from the first, second, third, and fourth reflective targets 26,30,56,58, respectively.

As best seen in FIG. 2, a first connecting means 86 movably connects the first signaling means 78 to the frame first side 16 at a first location 88 on the frame first side 16 adjacent the frame second end portion 22. The first signaling means 78 is movable in a direction toward the frame first side 16, in a passing relationship with the frame first side 16, to a location between the frame first and second sides 16,18 in response to an external force being applied to the first movable connecting means 86 in a direction towards the frame first side 16. A second connecting means 90 movably connects the second signaling means 80 to the frame first side 16 at a second location 92 on the frame first side 16 spaced from the first location 88 and adjacent the frame first end portion 20. The second signaling means 80 is movable in a direction toward the frame first side 16, in a passing relationship with the frame first side 16, to a location between the frame first and second sides 16,18 in response to an external force being applied to the second connecting means 90 in a direction toward the frame first side 16. A third connecting means 94 movably connects the third signaling means 82 to the frame second side 18 at a third location 96 on the frame second side 18 adjacent the frame second end portion 22. The third signaling means 82 is movable in a direction towards the frame second side 18, in a passing relationship with the frame first side 18, to a location between the first and second sides 16,18. A fourth connecting means 98 movably connects the second signaling means 80 to the frame second side 18 at a fourth location 100 on the frame spaced from the third location 96 and adjacent the frame first end portion 20. The fourth signaling means 84 is movable in a direction toward the frame second side 18, in a passing relationship with the frame second side 18, and to a location between the frame first and second sides 16,18 in response to an external force being applied to the fourth connecting means 98 in a direction toward the frame second side 18.

The first connecting means 86 normally biases the first signaling means 78 to an aligned position relative to the first reflective target 26 at which at least a portion of the first signaling means 78 is spaced outwardly from the frame first side 16 and at which the first signaling means 78 is positioned to deliver tne first signal to the first reflective target 26 and receive a reflection of the first signal from the first reflective target 26. The second connecting means 90 normally biases the second signaling means 80 to an aligned position relative to the second reflective target 30 at which at least a portion of the second signaling means 80 is spaced outwardly from the frame first side 16 and at which the second signaling means 80 is positioned to deliver the second signal to the second reflective target 30 and receive a reflection of the second signal from the second refleltive target 30. The third connecting means 94 normally biases the third signaling means 82 to an aligned position relative to the third reflective target 56 at which at least a portion of the third signaling means 82 is spaced outwardly from the frame second side 18 and at which the third signaling means 82 is positioned to deliver the third signal to the first reflective target 56 and receive a reflection of the first signal from the first reflective target 56. The fourth connecting means 98 normally biases the fourth signaling means 84 to an aligned position relative to the fourth reflective target 58 at which at least a portion of the fourth signaling means 84 is spaced outwardly from the frame second side 18 and at which the fourth signaling means 84 is positioned to deliver a fourth signal to the fourth reflective target 58 and receive a reflection of the fourth signal from the fourth reflective target 58. It is to be noted that the first reflective target 26 is at its aligned position when the first bumper first end portion 34 is at an at rest position and the third target 56 is at the aligned position with the third signaling means 82 when the first bumper second end portion 36 is at its at rest position. Similarly, the second reflective target 30 is at its aligned position with the second signaling means 80 only at and at rest position of the second bumper first end portion 46, and the fourth target is aligned with the fourth signaling means only at the at rest position of the second bumper second end portion 48. The at rest position of the first and second bumpers 32,44 is a position that the bumper takes when no external forces or loads are applied to deflect and deform the bumper.

The first and third targets 26,56 are movable in response to movement of the first bumper 32 from the at rest position to a position spaced from the at rest position, and the second and fourth targets 30,58 are movable in response to movement of the second bumper 44 from the at rest position to a position spaced from the at rest position. It is to be noted that the retro-reflective material 76 of each of the first, second, third, and fourth targets 26,30,56,58 face the first, second, third, and fourth signaling means 78,80,82,84, respectively, at the at rest positions.

The frame first side has a first aperture 102 of preferably a rectangular shape disposed therein at the first location 88, and a second aperture 104 disposed therein at the second location 92. Similarly, the frame second side 18 has a third aperture 106 of preferably a rectangular configuration disposed therein at the third location 96, and a fourth aperture 108 of preferably a rectangular configuration, disposed therein at the fourth location 100. The first, second, third, and fourth connecting means 86,90,94,98 are disposed in the first, second, third, and fourth apertures 102,104,106,108, respectively, and movable in a passing relationship with the opening defined thereby.

The first connecting means 86 includes a first adjusting means 110 for adjusting the position of the first signaling means 78 relative to the first reflective target 26. The second connecting means 90 includes a second adjusting means 112 for adjusting the position of a second signaling means 80 relative to the second reflective target 30. The third connecting means 94 includes a third adjusting means 114 for adjusting the position of the third signaling means 82 relative to the third reflective target 56. And, the fourth connecting means 98 includes a fourth adjusting means 116 for adjusting the position of the fourth signaling means 84 relative to the fourth reflective target 58. It is to be noted that the first, second, third, and fourth adjusting means 110,112,114,116 permit adjustment of the connecting means 86,90,94,98 so that the targets and signaling means are aligned at the at rest positions, respectively, to deliver and receive the reflective signals.

The first, second, third, and fourth connecting means 86,90,94,98; the first, second, third, and fourth signaling means 78,80,82,84; and the first, second, third, and fourth adjusting means 110,112,114,116 are respectively identical in construction. Therefore, any discussion with respect to one of the connecting, adjusting, or signaling means will relate to each of the connecting, adjusting, and signaling means. Referring to FIG. 4, an enlarged detail of the second connecting, signaling, and adjusting means 90,80,112 but a representative embodiment of each of the first, second, third, and fourth connecting, signaling, and adjusting means 86,90,94,98; 78,80,82,84; and 110,112,114,116. Each of the first, second, third, and fourth connecting means 86,90,94,98 include an elongate strip 118 which has first and second spaced apart end portions 120,122 and a middle portion 124 located between the first and second spaced apart end portions 120,122, a fastener 126 for connecting the elongate strip first end portion 120 to the frame 12 and means 128 for securing the first, second, third, and fourth signaling means 78,80,82,84 to the middle portion 124 of their respective elongate strips 118. The elongate strip middle portion 124 of each of the first, second, third, and fourth connecting means 86,90,94,98 is disposed in and extends through the first, second, third, and fourth apertures 102,104,106,108, respectively, at the aligned position of the first, second, third, and fourth signaling means 78,80,82,84. Preferably, the elongate strips are each formed of a flexible material, for example, spring steel, non-metallic plastic, and the like, and have adequate biasing force and memory to return to the respective aligned positions. Each of the first, second, third, and fourth signaling means 78,80,82,84 include an optical transmitter/receiver which has a body 132. The securing means 128 includes an aperture 134 disposed in the middle portion 124 for receiving the body 132 of the optical transmitter/receiver 130 and means 136 for fastening the body 132 to the elongate strip middle portion 124. Preferably, the fastening means includes a threaded portion 138 on the body 132 and a pair of nuts 140 screwthreadably engaged with the threaded portion and in clamping engagement with the elongate strip middle portion 124. Preferably, fastener 126 includes a threaded plate 142, a bore 144 in the frame 12, and a threaded fastener 146 disposed in the bore 144 and screwthreadably engaged with the plate 142. It is to be noted that the elongate strip first end portion 120 is sandwiched between the plate 142 and frame 12 and clamped therebetween.

The first, second, third, and fourth adjusting means 110,112,114,116 each include a threaded bore 148 disposed in the frame at a location on the frame adjacent the elongate strip second end portion 122 and an adjusting screw 150 screwthreadably disposed in the threaded bore and engageable with the elongate strip second end portion 122. The elongate strip 118 is yieldably movable at the first end portion 120 in response to longitudinal movement of the adjusting screw relative to the frame first and second sides 16,18, respectively.

INDUSTRIAL APPLICABILITY

With reference to the drawings of FIGS. 1-4, and in operation, as the vehicle 10 traverses the underlying terrain, it passes many objects along its path that are within close proximity thereto. In situations where the object is within the preselected minimum distance from either of the first and second sides 16,18, the optical signal delivered from one of the first, second, third, and fourth signaling means will be obstructed. Since each of the connecting means 86,90,94,98, signaling means 78,80,82,84, and targets 26,30,56,58 are identical in construction and operation. The remainder of the discussion will deal with only the first connecting and signaling means 86,78 and first target 26. However, this discussion will relate to each of the signaling and connecting means and other targets as well. Blockage of the light signal delivered from the first signaling means 78 to the first target 26 or blockage of the reflection from the first target 26 to the first signaling means 78 will result in the first signaling means 78 directing a control signal to the vehicle control system at which time one of an assortment of changes in vehicle operation may take place. For example, braking of the vehicle, slowing down of the vehicle, or a steering maneuver of the vehicle to move away from the object.

In situations where an object contacts either the first signaling means 78 or the first connecting means 86, the connecting means will move from the extended position outboard the vehicle first side 16 to a location towards the vehicle. At no time will the amount of force applied by the object to the first connecting means 86 be greater than the biasing force of the first connecting means 86. It should be observed that this biasing force is adequate to provide stability of the first connecting means 86 but light enough in magnitude to move easily and prevent damage to the object engaged. When the object and vehicle 10 are spaced an adequate distance from each other, the biasing force of the elongate strip 118 will return the first signaling means 78 to the aligned position with the first target 26 at which the light signal delivered from the first signaling means 78 to the reflective target 26 is reflected back to the first signaling means 78. Upon return of the first signaling means 78 to the aligned position, the first signal means 78 will notify the vehicle control unit (not shown) and the vehicle 10 will once again continue to operate in the normal fashion.

Should the first mounting means 24 contact the object with sufficient force to move the first target 26 from the at rest position to a location spaced therefrom, the reflective signal from the first target 26 will be directed away from the first signaling means 78. Thus, as previously discussed, the vehicle control unit will once again be notified of this condition and appropriate action will be taken by the vehicle 10.

It is to be noted that the first bumper first and second end portions 34,36 extend to a location transversely outwardly of the first and second sides 16,18, respectively, and the reflective signal from the first and third targets 26,56 are mounted on the first and second sides 34,36 at a location of maximum outward positioning. Therefore, there are no blind spots along the side of the vehicle occur. This is especially true since both the first and second vehicle sides 16,18 have a target associated with each vehicle end 26,30,56,58 and a signaling means 78,80,82,84 associated with each target. Therefore, full coverage and protection of the vehicle sides from encroachment by an object is provided. It should be noted that in the event that one of the first and second or third and fourth signaling means 78,80,82,84 should fail, the remaining signaling means on the failed side would be operative and capable of identifying an object that was too close to the vehicle 10.

Since the first, second, third, and fourth signaling means 78,80,82,84 rely on a reflected signal from the first, second, third, and fourth targets 26,30,56,58 to maintain normal vehicle operation and not a reflective signal from the object of encroachment, the potential for error and improper operation is reduced. Also, since there are no physical connections between the signaling means 78,80,82,84 and the first, second, third, and fourth targets 26,30,56,58, the potential for a mechanical breakdown is minimized.

The first, second, third, and fourth adjusting means 110,112,114,116 permit finite adjustments of the position of the first, second, third, and fourth signaling means 78,80,82,84, respectively, relative to the first, second, third, and fourth targets 26,30,56,58 and establish the base line position of each signaling means 78,80,82,84 of the object sensing arrangement 23.

Other aspects, objects, and advantages of this invention can be obtained from a study of the drawings, the disclosure, and the appended claims.

We claim:

1. An object sensing arrangement for a vehicle having a frame, said frame having first and second spaced apart sides and first and second spaced apart end portions connected to and between the first and second spaced apart sides, comprising:
   a first reflective target;
   a first mounting means for movably connecting the first reflective target to the frame first side at a location on the frame first side adjacent the frame first end portion;
   first signaling means for delivering a first signal to the first reflective target and receiving a reflection of said first delivered signal from said first reflective target;
   first connecting means for movably connecting said first signaling means to said frame first side at a first location on the frame first side between the frame first and second end portions and adjacent the frame second end portion, and for maintaining said first signaling means for movement in a direction toward said frame first side, in a passing relationship with said frame first side, and to a location between the frame first and second sides in response to an external force being applied to said first connecting means in a direction toward said frame first side.

2. An object sensing arrangement, as set forth in claim 1, wherein said first mounting means includes a first bumper having first and second spaced apart end portions, said first bumper first end portion being connected to the frame first side at a location on the frame first side adjacent the frame first end portion, and said first bumper second end portion being connected to the frame second side at a location on the frame second side adjacent the frame first end portion.

3. An object sensing arrangement, as set forth in claim 1, wherein said first connecting means normally biases said first signaling means to an aligned signal reflecting position relative to said first reflective target at which at least a portion of the first signaling means is spaced outwardly from the frame first side.

4. An object sensing arrangement for a vehicle having a frame, said frame having first and second spaced apart sides and first and second spaced apart end portions connected to and between the first and second spaced apart sides, comprising:
   a first reflective target;
   a first mounting means for movably connecting the first reflective target to the frame first side at a location on the frame first side adjacent the frame first end portion;
   first signaling means for delivering a first signal to the first reflective target and receiving a reflection of said first delivered signal from said first reflective target;
   first connecting means for movably connecting said first signaling means to said frame first side at a first location on the frame first side adjacent the frame second end portion, said first signaling means being movable in a direction toward said frame first side, in a passing relationship with said frame first side, and to a location between the frame first and second sides in response to an external force being applied to said first connecting means in a direction toward said frame first side, said frame first side having a first aperture positioned at said first location on the frame first side adjacent the frame second end portion, and said first connecting means includes;
   an elongate strip having first and second spaced apart end portions and a middle portion;
   a fastener connecting the first end portion of the elongate strip to the frame; and
   means for securing the first signaling means to the elongate strip middle portion, said elongate strip middle portion being disposed in and extending through said first aperture at the aligned position of the first signaling means.

5. An object sensing arrangement, as set forth in claim 4, wherein said elongate strip is formed of a flexible spring steel.

6. An object sensing arrangement, as set forth in claim 4, wherein said first connecting means includes a first adjusting means for adjusting the position of said first signaling means relative to said first reflective target.

7. An object sensing arrangement, as set forth in claim 6, wherein said first adjusting means includes:
   a threaded bore disposed in the frame first side at a location adjacent the elongate strip second end portion; and
   an adjusting screw screwthreadably disposed in the threaded bore and engageable with the elongate strip second end portion, said elongate strip being yieldably movable at said first end portion in response to longitudinal movement of the adjusting screw relative to the frame first and second sides.

8. An object sensing arrangement, as set forth in claim 4, wherein the elongate strip middle portion has an aperture disposed therethrough, and said first signaling means includes:
   an optictal transmitter/receiver having a body and being disposed in the elongate strip middle portion aperture; and
   means for fastening the body to the elongate strip middle portion.

9. An object sensing arrangement, as set forth in claim 2, wherein said first bumper has an upper edge extending between the first bumper first and second end portions and said first reflective target includes:

a post having first and second spaced apart end portions and being connected at said post first end portion to the first bumper first end portion, said post extending elevationally upwardly from the first bumper first end portion to a location past the first bumper upper edge; and a retro-reflective material connected to the post second end portion at a location on the post second end portion spaced elevationally above the first bumper upper edge, said retro-reflective material facing said first signaling means.

10. An object sensing arrangement, as set forth in claim 2, wherein said first bumper is constructed of a flexible material and pivotally connected at the first bumper first and second end portions to the frame first and second sides, respectively.

11. An object sensing arrangement, as set forth in claim 3, wherein said first bumper is constructed of a flexible material and movable from an at rest position in response to an external force being applied thereto, said first reflective target being movable in response to movement of the first bumper from said at rest position, and said first reflective target being positioned to reflect said first signal to said first signaling means at the at rest position of the first bumper.

12. A material handling vehicle, comprising:
a frame having first and second spaced apart sides and first and second spaced apart end portions connected to and between the first and second spaced apart sides;
a first bumper having first and second spaced apart end portions and an upper edge, said first bumper first end portion being connected to the frame first side at a location on the frame first side adjacent the frame first end portion, and said first bumper second end portion being connected to the frame second side at a location on the frame second side adjacent the frame first end portion;
a second bumper having first and second spaced apart end portions and an upper edge, said second bumper first end portion being connected to the frame first side at a location on the frame first side adjacent the frame second end portion and said second bumper second end portion being connected to the frame second side at a location on the frame second side adjacent the frame second end portion;
a first reflective target connected to the first bumper first end portion and extending elevationally from the first bumper first end portion to a location spaced above the first bumper upper edge;
a second reflective target connected to the second bumper first end portion and extending elevationally from the second bumper first end portion to a location spaced above the second bumper upper edge;
first signaling means for delivering a first signal to said first reflective target and receiving a reflection of said first delivered signal from said first reflective target;
second signaling means for delivering a second signal to said second reflective target and receiving a reflection of said second delivered signal from said second reflective target;
first connecting means for movably connecting said first signaling means to said frame first side at a first location on the frame first side between the frame first and second end portions and adjacent the frame second end portion, and for maintaining said first signaling means for movement in a direction toward said frame first side, in a passing relationship with the frame first side, and to a location between the frame first and second sides in response to an external force being applied to said first connecting means in a direction toward said frame first side; and
second connecting means for movably connecting said second signaling means to said frame first side at a second location on the frame first side spaced from the first location between the frame first and second end portions and adjacent the frame first end portion, and for maintaining said second signaling means for movement in a direction toward said frame first side, in a passing relationship with the frame first side, and to a location between the frame first and second sides in response to an external force being applied to said second connecting means in a direction toward said frame first side.

13. A material handling vehicle, as set forth in claim 12, wherein said first connecting means normally biases said first signaling means to an aligned position relative to the first reflective target at which at least a portion of the first signaling means is spaced outwardly from the frame first side and at which said first signaling means is positioned to deliver said first signal to said first reflective target and receive a reflection of said first signal from said first reflective target, and said second connecting means normally biases said second signaling means to an aligned position relative to the second reflective target at which at least a portion of the second signaling means is spaced outwardly from the frame first side and at which said second signaling means is positioned to deliver said second signal to said second reflective target and receive a reflection of said second signal from said second reflective target.

14. A material handling vehicle, as set forth in claim 12, wherein said first and second bumpers are each constructed of a flexible material and are each movable from an at rest position in response to an external force being applied thereto, said first reflective target being movable in response to movement of the first bumper from said at rest position and said second reflective target being movable in response to movement of the second bumper from said at rest position, said first reflective target being positioned to reflect said first signal to the first signaling means at the at rest position of the first bumper and said second reflective target being positioned to reflect said second signal to said second signaling means at the at rest position of the second bumper.

15. A material handling vehicle, as set forth in claim 14, wherein said first and second end portions of the first and second bumpers project transversely outwardly from the frame first and second sides, respectively.

16. A material handling vehicle, as set forth in claim 12, wherein said first and second reflective targets each include:
a post having first and second spaced apart end portions, said first reflective target post first end portion being connected to the first bumper first end portion and said second reflective target post first end portion being connected to the second bumper first end portion, said first reflective target post second end portion being elevationally spaced above the first bumper upper edge and said second reflective target post second end portion being elevationally spaced above the second bumper upper edge; and a retro-reflective material connected to the second end portion of each post of the first and second targets, said retro-reflective material of the first reflective target facing said first signaling means and said retro-reflective material of the second reflective target facing the second signaling means.

17. A material handling vehicle, as set forth in claim 12, wherein said first and second connecting means each include:

an elongate strip having first and second spaced apart end portions;

a fastener connecting each elongate strip to the frame first side; and means for securing each of the first and second signaling means to a respective one of the elongate strips of the first and second connecting means.

18. A material handling vehicle, as set forth in claim 12, including:

first adjusting means for adjusting the position of the first signaling means relative to the first reflective target; and second adjusting means for adjusting the position of the second signaling means relative to the second reflective target.

* * * * *